FIG. 1.

INVENTORS.
J. M. Curts, Jr.
BY D. E. Nestor
Robb & Robb
Attorneys.

INVENTORS.

United States Patent Office 2,897,707
Patented Aug. 4, 1959

2,897,707
APPARATUS FOR SIZING AND FINISHING BAR STOCK

Joseph M. Curts, Jr., and Donald E. Nestor, Lykens, Pa., assignors to Reiff & Nestor Company, Lykens, Pa., a corporation of Pennsylvania Application April 19, 1955, Serial No. 502,316

10 Claims. (Cl. 82—2.5)

The present invention relates to an improved method and apparatus for sizing and finishing bar stock of random lengths, and more particularly to such an improved method and apparatus for removing surface decarburization or scale from hot rolled steel bars, for removing surface defects, seams and the like from ferrous or non-ferrous round metal bars, and for finishing such bars with a surface finish of high quality and size accuracy.

A primary object of the invention is to provide such a method which contemplates rotatably supporting bar stock while moving each bar axially to a feeding station, positively feeding the bar axially from the feeding station past a sizing and finishing station where the bar is cut down to a predetermined size and finished with a high quality surface finish, and pushing the finished bar beyond the sizing and finishing station by positively feeding a succeeding bar to the latter station while maintaining rotation of the finished bar.

Another object of the invention is to provide a machine, hereinafter referred to as a bar turning machine for the sake of simplicity, which is particularly suited for performing the method above referred to by axially feeding bar stock of random lengths past a stationary cutting tool, while rotating such stock at a relatively high rate of speed.

This objective is preferably attained by the provision of a plurality of axially spaced, coaxially aligned rotary spindles, each having a collet adapted to grip a bar and rotate the same as the bar is presented to the collets, bar feeding means for engaging the bar to feed the same axially and thus advance successive bars through the collets, and bar cutting means disposed adjacent to one of the collets and operative to cut the bars to a predetermined diametrical size as the bars are rotated and fed axially past the cutter.

Another object is to provide a bar turning machine as aforesaid in which the spindles are journalled in bearings which are adjustable to vary the loading thereof, whereby radial deflection is obviated and maximum accuracy of size is maintained as bars are turned and cut to a predetermined diametrical size at a relatively high rate of speed.

A further object is to provide a bar turning machine as aforesaid in which the bar feeding means is adjustable to feed bars of different diameters and also adjustable to feed bars at different rates of linear speed, as may be desired or required.

Another object is to provide feed mechanism as aforesaid for a bar turning machine, which feed mechanism is pivotally mounted for movements into and out of a bar feeding position and includes a plurality of feed rolls which are independently replaceable and accessible for service when moved to a non-feeding position.

Still another object is to provide a bar turning machine as aforesaid which includes a relatively stationary cutter for cutting bars to a predetermined size or diameter as they are fed past the cutter, said cutter preferably including a cutting element removably carried by an adjustable support for varying the cut to be made by the cutting element, and the cutting element being in the form of a cylindrical member having its bar-engaging and preferably cut off normal to the axis of the cutting element so as to form an annular cutting edge at the juncture of the end plane of the element with the cylindrical periphery thereof.

A still further object is to provide a machine which is capable of feeding random length bar stock past a relatively stationary cutting element, while rotating such bars at a relatively high rate of speed, said relatively stationary cutting element being disposed and so formed as to have a negative angle of rake and a negative angle of clearance with respect to the bars being cut, whereby a very fine finish of the bars is attained.

Yet another object is to provide a bar turning machine including a plurality of axially spaced, coaxially aligned rotary spindles, said spindles each having a collet adapted to engage a bar to impart rotation thereto as the bar is advanced through the collets past a cutter, means for rotating the spindles, and certain of the spindles being shiftably mounted on a fixed support so as to be shifted out of their normal operative positions when a misformed or over-size bar is presented to the collets of the shiftable spindles, and means for interrupting the drive to the spindles upon such shifting of any of the shiftable collets, thereby protecting the collets against breakage and/or undue wear or deformation.

Other objects and advantages will be hereinafter described or will become apparent to those skilled in the art, and the novel features of the invention will be defined in the appended claims.

In the drawings:

Fig. 4 is a fragmentary view on an enlarged scale and in vertical section, as taken on the line 4—4 of Fig. 2a;

Like reference characters in the several figures of the drawings and in the following detailed description designate corresponding parts.

*General description*

Referring first to Figs. 1, 2, 2a, 3 and 11, it will be seen that the machine of the present invention includes a suitable base 1. The base 1 preferably is formed of angle irons or other members having sufficient rigidity to afford a strong, solid base. At each end of the base, it is provided with a pair of vertical legs 2, 2 on which are suitably mounted and rigidly secured a pair of parallel, laterally spaced and longitudinally extended side rails 3, 3 which are interconnected by a pair of spaced end rails 4, 4. Mounted on the end rails 4 at opposite ends of the base is a pair of upstanding supports 5, 5 on which is rigidly mounted a superstructure 6, this superstructure including longitudinally extended, parallel and laterally spaced side bars 7, 7 and end bars 8, 8. The side bars 7 are interconnected by a plate which provides a relatively broad flat surface or table 9.

Intermediate the ends of the table 9, a spindle-supporting frame or cage 10 is rigidly attached to the table by any suitable fastening means. This spindle-support or cage 10 includes a pair of upstanding supports or standards 11, 11 disposed in spaced relation to one another and interconnected by a rigid strut 12 forming a part of the spindle support. Disposed in parallel relation to the table 9 and extended longitudinally in spaced relation relative to one another is a pair of elongated supporting bar members 13 and 14, these bars extending through the uprights 11, 11 which are provided with openings therethrough for receiving the bars 13 and 14. The bar 13 is diposed at an elevation above the bar 14 at one side of the machine, while the bar 14 is located at the opposite side of the machine.

Figure 11:
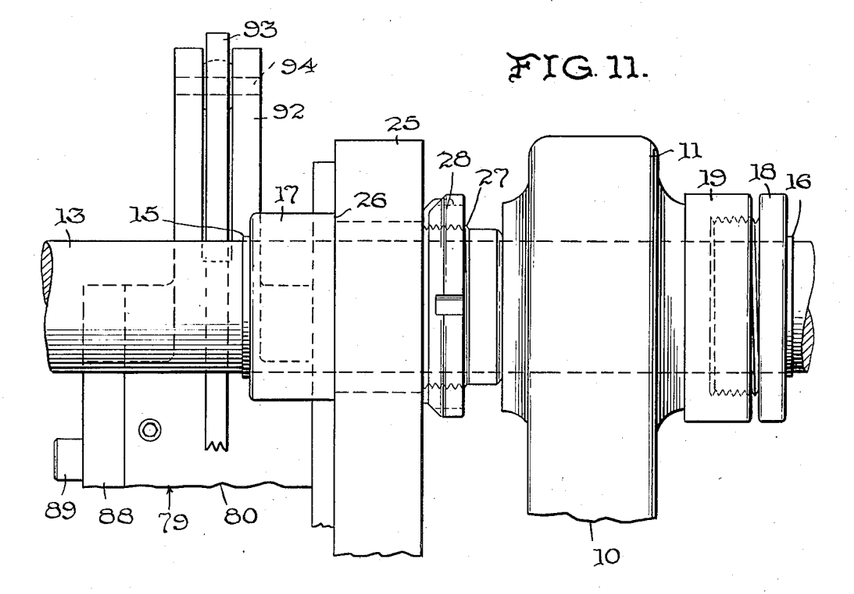
Fig. 11 is an enlarged fragmentary view in side elevation, as observed substantially on a plane represented by the line 11—11 of Figs 2 and 2a, and showing the means for mounting the upper longitudinally extended supporting bar in the relatively fixed spindle mounting.
Figure 12:
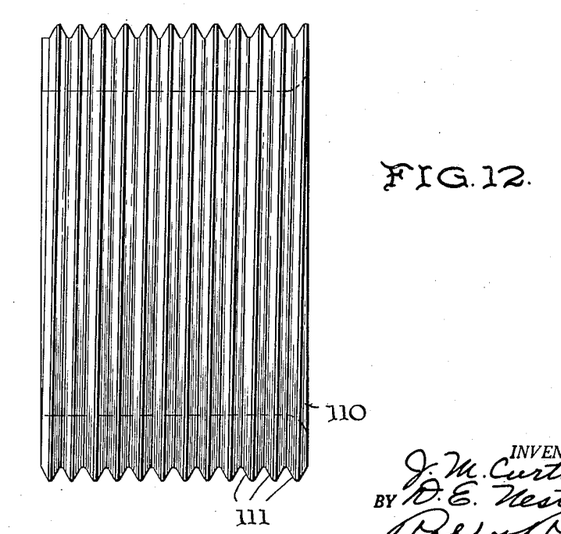
Fig. 12 is a detail view in elevation and on an enlarged scale of a feed roll.

The supporting bar 13 is mounted in the uprights 11 by any suitable means, but preferably as best disclosed specifically in Fig. 11, wherein it will be seen that the bar 13 has mounted thereon a pair of axially spaced retaining or snap rings 15 and 16, the ring 15 being located at one side of one of the uprights 11 and the ring 16 being located at the other side of said upright. Backed up by the retaining ring 15 is an axially extended bushing 17 which projects into engagement with said upright 11. Backed up by the ring 16 is an exteriorly threaded lock nut 18 which is threadedly engaged in an interiorly threaded sleeve or spacer 19, the spacer 19 engaging the opposite side of said upright 11. Thus, the bar 13 is maintained in a fixed axial position by the bushing 17 and the spacer 19.

Figure 2:
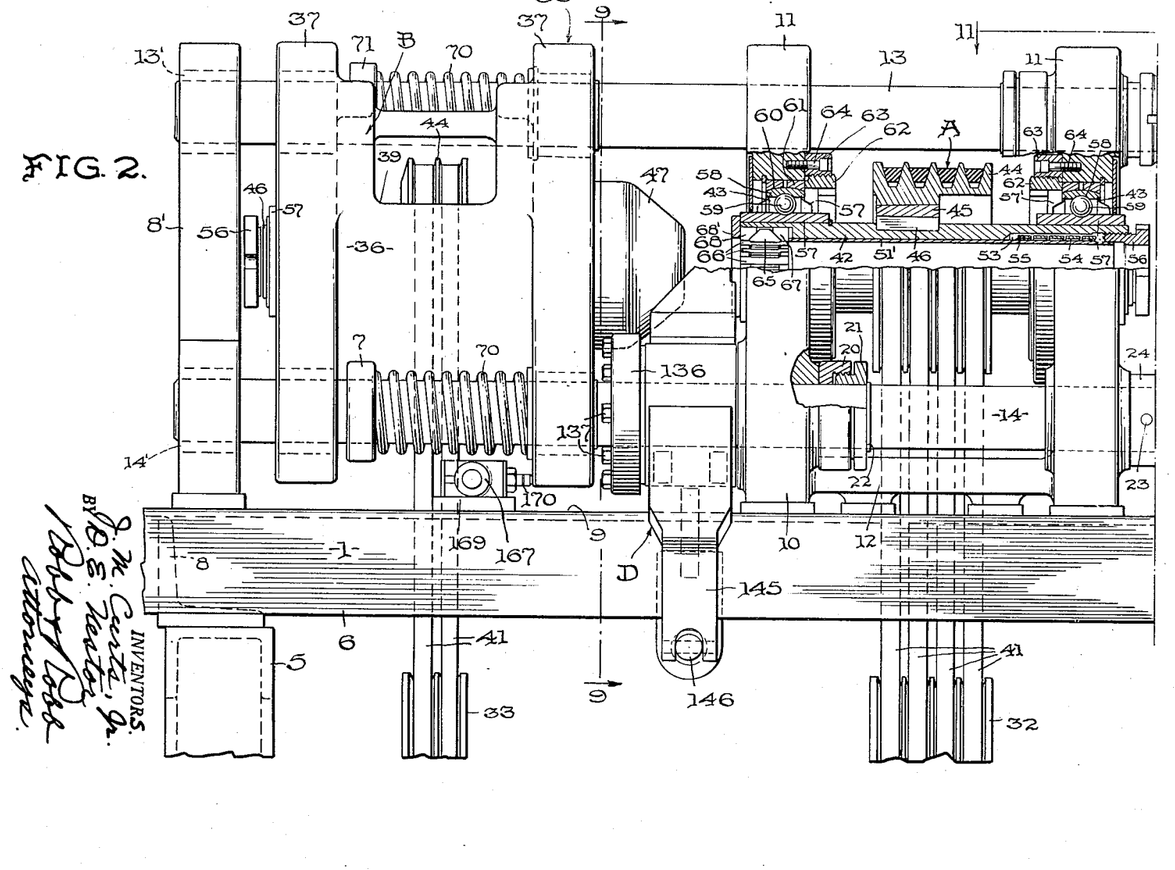
Fig. 2 is a view in side elevation on a slightly reduced scale of a portion of the machine, with certain of the parts shown in section.

Referring to Fig. 2, it will be seen that the bar 14 is fixed against axial movement in the upright supports 11 by means of an interiorly threaded hollow spacer 20 which encircles the bar 14 and engages one side of the lefthand upright 11, a threaded lock nut 21 being threaded into the spacer 20 and engaged with a retaining or snap ring 22 on the bar 14. By expanding the threaded spacer 20 against snap ring 22 a thrust is exerted against another snap ring 22′ shown in Fig. 10 as abutting against the inner race of a bearing 134 hereinafter more particularly described. Additional spacers 20′ and 20″ are disposed on bar 14 at the positions shown in Fig. 10 so that expansion of spacer 20 will force bearings 134, 134 and spacers 20′ and 20″ towards the adjacent upright 11 of spindle support 10 and press the spacer 20″ tightly against the latter upright 11.

Also on the bar 14, but adjacent to the righthand upright 11 in Fig. 2, there is secured, as by means of a set screw 23, a spacer 24 (see Fig. 2a), this spacer 24 engaging and locating a plate 25 constituting supporting means for bar feeding means at a bar feeding station of the machine, the bar feeding means generally being designated F.

For rigidly mounting the opposite extreme ends of the bars 13 and 14, there is provided a pair of generally L-shaped upstanding supports 8′, 8′, respectively suitably secured to the table 9 in overlying relation to each of the end bars 8 of the base 1. Adjacent to the outer end of each arm of the L-shaped supports 8′, 8′ they are formed with suitable openings having annular bushings 13′ and 14′, respectively, mounted therein for tightly receiving the extreme ends of the bars 13 and 14.

Referring more particularly to Fig. 11, it will be noted that the bushing 17 has a shoulder 26 thereon which engages one side of the plate 25, the bushing extending through an aperture in the plate 25 and pivotally mounting the plate upon the bar 13. At the opposite side of the plate 25, the bushing 17 is threaded, as at 27, and a lock nut and washer combination 28 is threadedly connected to the bushing 17 and bears against the plate 25 to clamp the same between the shoulder 26 and the lock nut and washer combination 28.

In addition to the bar feeding means F, the machine includes bar rotating means in the form of a plurality of hollow rotary spindles, one of which is generally designated A and is disposed between and rotatably supported by the uprights 11 previously described (see Fig. 2). A second spindle, generally designated B (see Fig. 2), is shiftably mounted upon the supporting bars 13 and 14, and a third spindle, generally designated C (see Fig. 2a), is also shiftably mounted upon the bars 13 and 14, the spindles B and C being disposed at the respective opposite sides of the spindle A.

The machine also includes a bar cutting station having bar cutting means, generally designated D (see Fig. 2), pivotally mounted upon the lowermost bar 14, said cutting means D being disposed intermediate the spindles A and B.

Figure 2A:
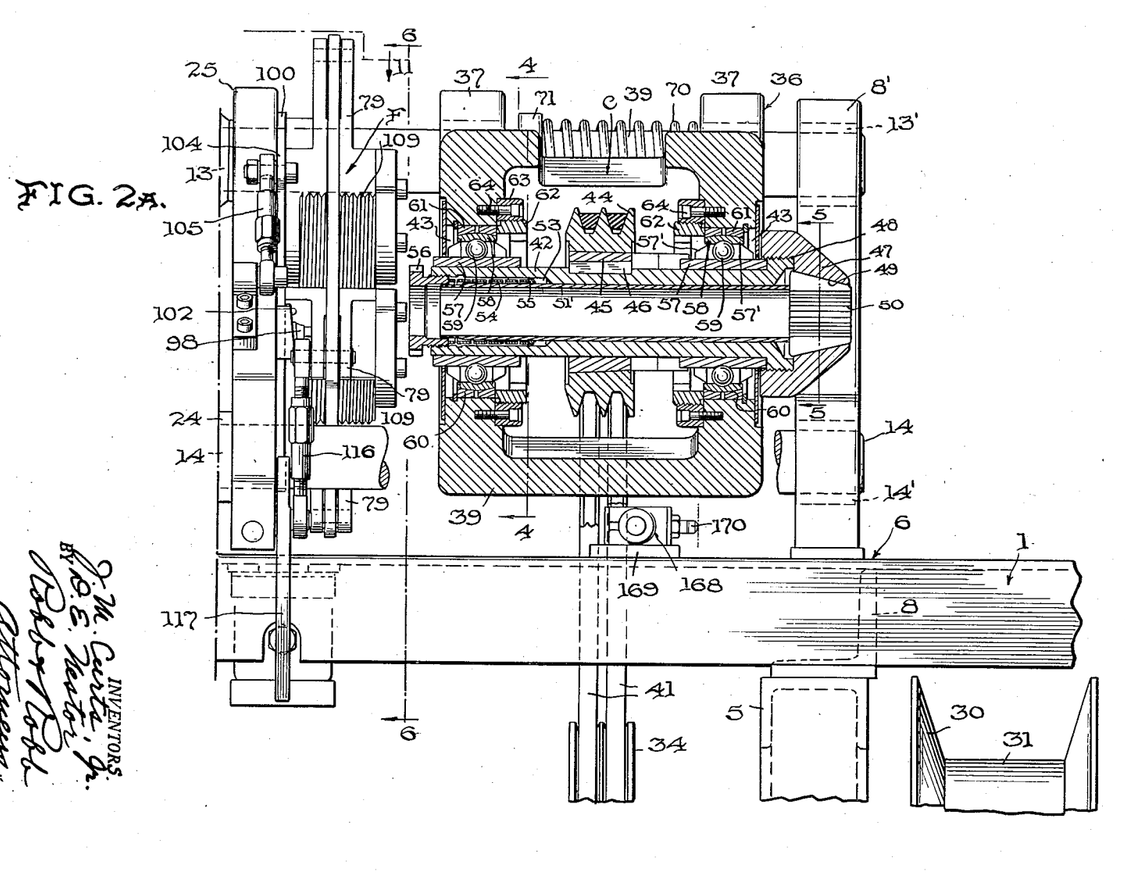
Fig. 2a is a view corresponding to Fig. 2, showing the remainder of the machine which is a continuation of Fig. 2.
Figure 3:
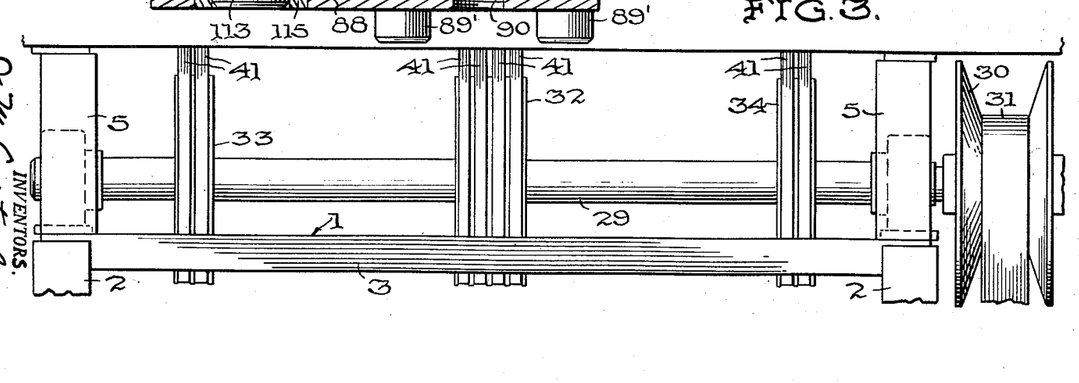
Fig. 3 is a fragmentary view in side elevation and on a reduced scale, showing the spindle driving means.

Referring particularly to Figs. 2, 2a and 3, driving means are disclosed for rotating the aforementioned spindles, such means preferably being in the form of an axially extended countershaft 29 which is journalled in the end supports 5, 5 of the base 1 and on which is suitably mounted at one end thereof a variable speed drive pulley 30 which is powered by a belt 31 leading from a suitable motor (not shown) to impart rotation to the shaft 29. Spaced along the shaft 29 at positions below the respective spindles are a plurality of drive pulleys respectively designated 32, 33 and 34. The drive pulley 32 is substantially centrally located upon the shaft 29 and has a multiple belt driving connection with the spindle A aforementioned, while the drive pulley 33 is located at one side of the pulley 32 and has a multiple belt drive connection with the spindle B, and the other drive pulley 34 is located on the shaft 29 at the other side of the pulley 32 and has a multiple belt drive connection with the spindle C. Preferably, the belt drive of pulley 32 includes four similar belts 41, whereas the belt drive of the pulleys 33 and 34 each includes two belts 41. Under the control of the variable speed drive 30, the drive means for the spindles is adapted to rotate the spindles at a relatively high rate of speed, on the order of from about 1860 r.p.m. to about 5575 r.p.m., as may be desirable or necessary to produce a high quality surface finish and size accuracy on stock bars of different diameters and/or of different materials.

Accordingly, the machine generally comprises a supporting base 1 having a pair of parallel, axially extended supporting bars 13 and 14 mounted thereon, a plurality of rotary spindles A, B and C spaced along said supporting bars and adapted to impart rotary movement to successive stock bars to be cut down as they are fed through the spindles by feeding means F in a manner which will hereinafter be more specifically described, and a cutter D mounted on one of the bars and adapted to cut the successive stock bars to a predetermined diameter, the spindles being rotated by means of a drive connection with a countershaft 29 journalled in the base 1 and adapted to be powered from a source of power through a variable speed drive 30.

*Bar turning spindles*

Figure 1:
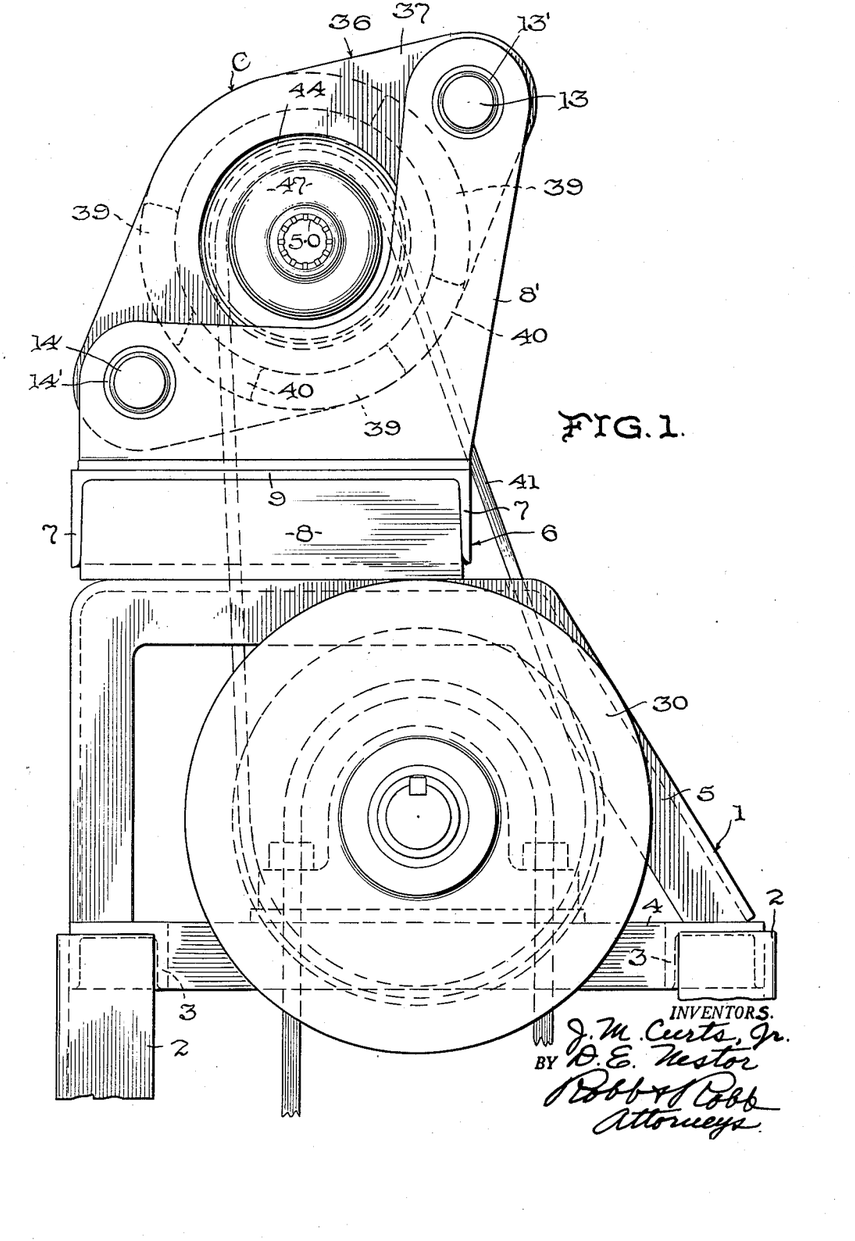
Fig. 1 is a fragmentary view in end elevation, showing the adjustable drive means and the spindle to which bars are initially presented at the beginning of their passage through the machine.
Figure 4:
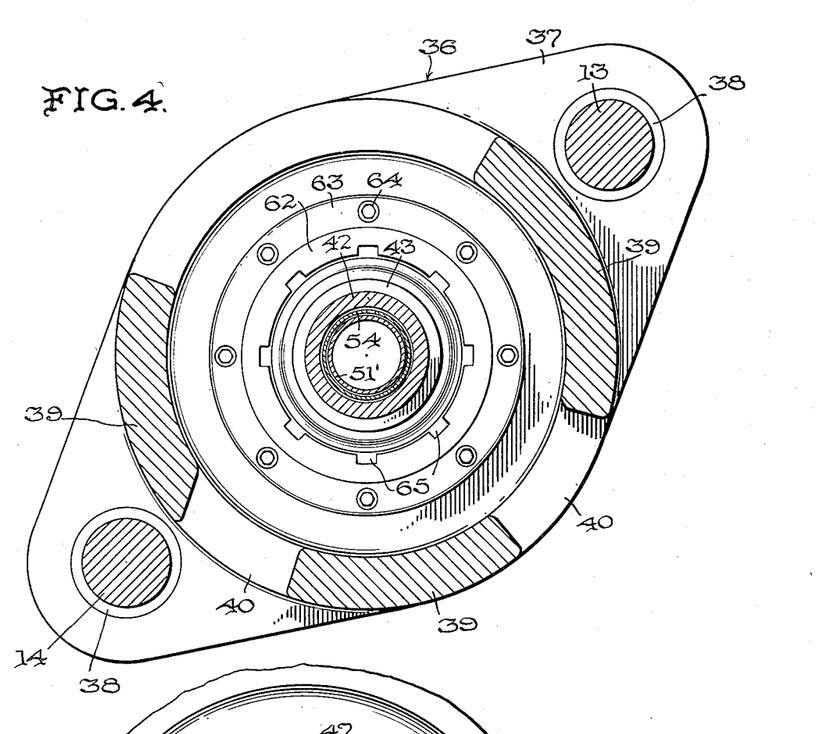
Figure 5:
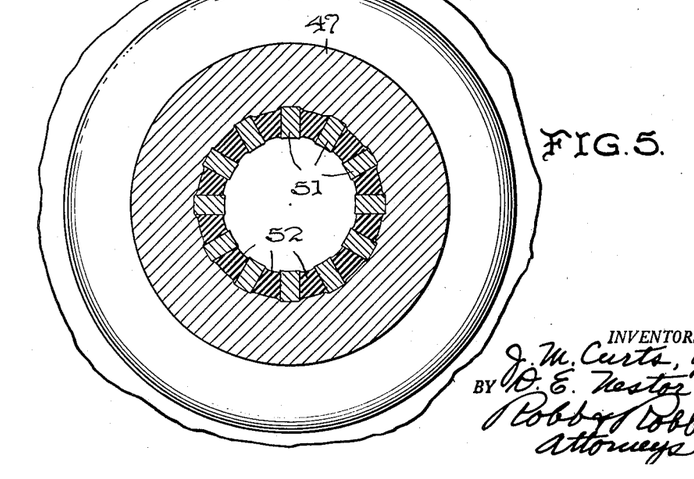
Fig. 5 is a fragmentary view on an enlarged scale and in vertical section, as taken on the line 5—5 of Fig. 2a through the first collet.

The spindle A is rotatably mounted in the relatively stationary spindle support 10 previously described, whereas the spindles B and C are respectively rotatably mounted in a pair of cages or spindle supports 36, 36, each cage 36 including a pair of axially spaced end walls 37, 37. As is best shown in Figs. 1 and 4, the end walls 37, 37 are generally elliptical in form. The opposite ends of the respective walls 37, 37 are each formed with an aperture therethrough, and the walls are slidably mounted upon the bars 13 and 14, with bushings 38 disposed in said apertures and shiftably supporting the spindle cages 36 on the bars 13 and 14, the walls 37 of the spindle cages being interconnected by circumferentially spaced ribs 39, between which are spaces 40 through which extend the belts 41 for the respective drive pulleys 33 and 34. Each end wall 37 of the respective spindle cages or supports 36 is provided with a central opening therethrough in axial alignment with one another, and centrally supported in these openings is a collet sleeve 42 which is journalled for rotation in the respective cages 36 by means of a pair of adjustable bearings generally designated 43, 43. Fixed upon the collet sleeve 42 in each cage 36 is a pulley 44 which is driven by the belts 41 to impart rotation to the sleeves 42, the pulleys 44 being secured on the collet sleeves 42 as by means of a tapered lock bushing 45 and a key 46 connecting the pulleys 44 to the respective sleeves 42 of spindles B and C. Mounted at one end of the respective collet sleeves 42 of spindles B and C, there is a collet head 47 which is threadedly connected to the sleeve 42 as at 48. Interiorly of the respective collet heads 47, they are each formed with an axially tapered opening 49 in which is shiftably mounted bar-gripping means in the form of an annulus 50 consisting of circumferentially spaced hardened steel blades 51 embedded in rubber, as at 52 (see Fig. 5) and tapered so as to fit within the tapered opening 49 in the collet head 47.

Concentrically and shiftably disposed in the respective collet sleeves 42 is a tubular pusher or liner 51' which extends the full length of the respective sleeves 42. At the end of each collet sleeve 42 opposite the head 47, the sleeves 42 are interiorly counterbored, whereby an annular clearance 53 is formed between the liner 51' and the sleeve 42, as is clearly shown in Fig. 14, and a coil spring 54 is disposed in the respective annular clearances 53, this coil spring abutting at one end with a ring 55 which is suitably attached to the outer surface of the respective liners 51', while the other end of the respective coil springs 54 is engaged by a spring adjusting member 56 which is threadedly mounted in the open end of the respective sleeves 42 and extends into the annular clearance 53.

Thus, a bar can be inserted into the gripping annulus 50 of each collet of spindles B and C and will cause the annulus to move axially in a direction to compress the respective springs 54 to thereby disengage the tapered surface 49 from the annulus 50 to permit insertion of stock bars having a limited range of variation in their diameter, but the springs 54 will urge the gripping annuli 50 in a direction to grip the bars so as to permit rotation of the bars by the collets, and the pressure of the springs 54 upon the gripping annuli 50 may be readily adjusted by rotating the spring adjusters 56 of the collets B and C. In addition, the annular collets 50 can be readily replaced by collets of a different size, so that stock bars of a different range of sizes can be suitably gripped by the collet to impart rotation to the bars.

In order to permit high speed rotation of the collets and consequently of a bar or bars in the collets, while prohibiting radial deflection of the bars, the bearings 43 previously mentioned are so constructed as to permit the loading thereof to be adjusted. In this connection, each bearing 43 preferably includes a wide inner race 57 mounted on the respective collet sleeves 42, an outer race 58, a plurality of rolling elements, preferably in the form of balls 59, the outer race having an exterior annular surface 60 which is arched in an axial direction, and a correspondingly axially arched bearing race support 61 which is adapted to be adjusted axially relative to the outer bearing race so as to shift the outer bearing race inwardly to increase the load on the balls 59 or to reduce the load on the balls 59. Such axial adjustment of the bearing race support 61 is preferably effected by means of an annular adjuster member 62 which is threadedly mounted in an annular supporting element 63 which is in turn secured to the respective end walls of the spindle cages or supports, as by means of a suitable number of screw fasteners 64. As is best illustrated in Fig. 4, each annular member 62 is preferably provided about its inner periphery with a plurality of circumferentially spaced notches or recesses 65 adapted to receive a spanner wrench or other appropriate tool for effecting rotation of the member 62, whereby it is shifted axially to shift the bearing race support 61 relative to the outer bearing race of each bearing 43, thus to increase or decrease load on the bearings and to assure smooth, deflection-free rotation of a stock bar by the respective spindles. In order to maintain the bearing 43 free of dirt, cuttings, or the like, an annular sealing element 57' is disposed on the respective opposite sides of the balls 59 and extends generally radially into sealing contact with the inner and outer races of each bearing, the sealing elements being flexible so as to permit adjustment of the bearings as aforesaid.

The foregoing description of the respective spindles applies equally to the spindles B and C and substantially to the spindle A, except for the fact that the pulley 44 on the collet sleeve 42 of spindle A is adapted to accommodate preferably four drive belts 41 for imparting rotation to the sleeve 42 of spindle A from the drive pulley 32. In addition, the bar-gripping means of the collet in spindle A is more particularly adapted to rigidly grip a bar for imparting rotation thereto with a more firm holding action than the annuli 50 of the collets of spindles B and C. Therefore, where applicable, the same reference characters are applied to spindle A as are applied to spindles B and C, except in connection with the modified bar-gripping means or collet construction.

Figures 8, 13, 14:
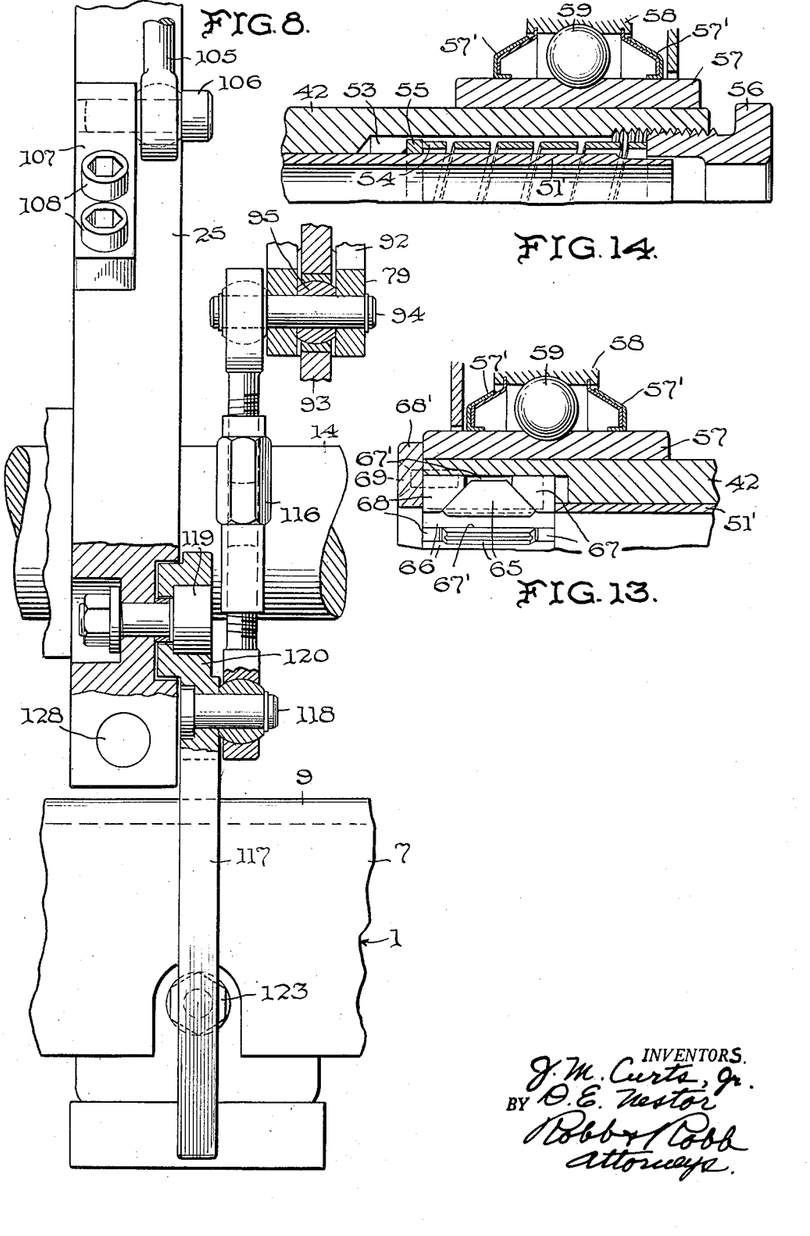
Fig. 8 is an enlarged fragmentary view, partly in section and partly in side elevation, of the means for effecting engagement and disengagement of the feeding means with a bar, as observed substantially on a plane represented by the line 8—8 of Fig. 6.
Fig. 13 is an enlarged fragmentary view in section showing a portion of the collet which is disposed adjacent to the cutting means.
Fig. 14 is an enlarged fragmentary view in section showing the means for adjusting the collet of Fig. 13 and corresponding to the means for adjusting the other collets.
Figure 9:
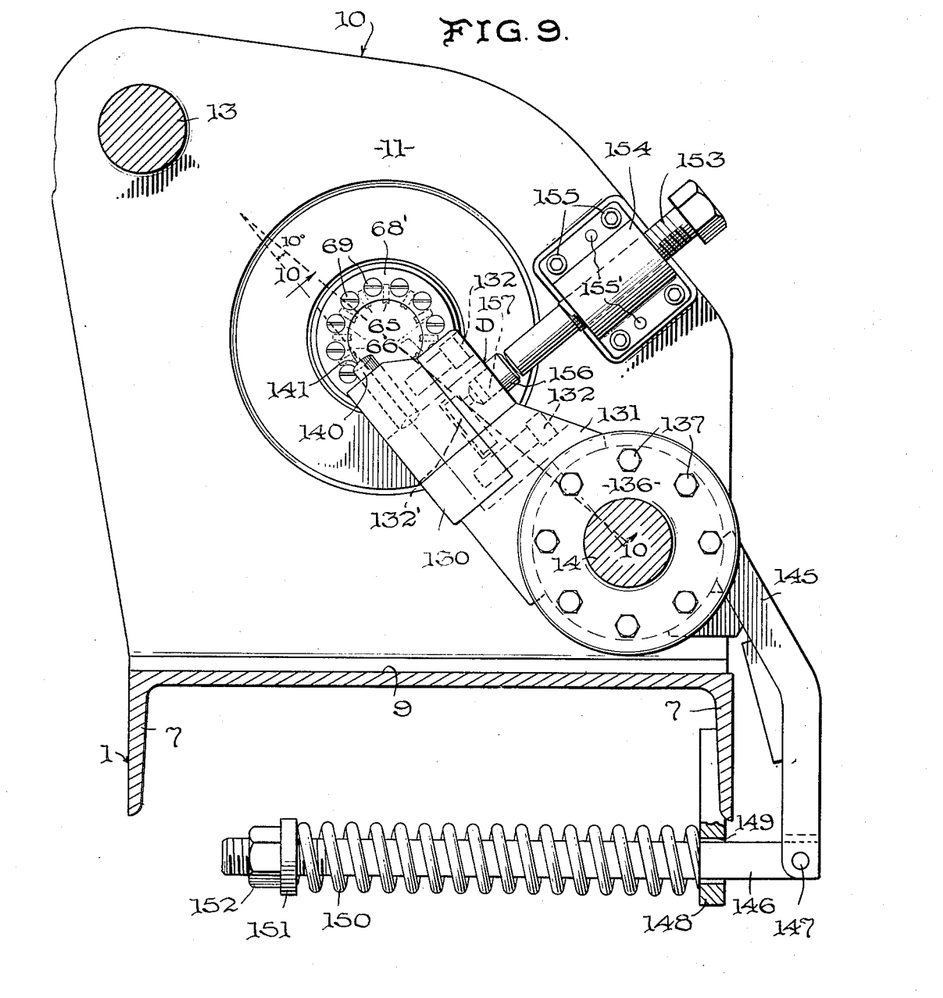
Fig. 9 is a view in vertical section and on an enlarged scale, as taken on the line 9—9 of Fig. 2, and showing certain details of the cutting means.

With particular reference to Figs. 2, 9 and 13, the bar-gripping means or collet of spindle A includes a plurality of circumferentially spaced wedge-shaped hardened metal gripping elements 65 (see Fig. 13). These gripping elements 65 are disposed in circumferentially spaced, axially extended slots 67' formed interiorly of the end of this collet sleeve 42 opposite the spring 54, and a series of ribs 66 forming the respective opposite sides of the slots 67' engage the opposite sides of the gripping elements 65 to position the latter circumferentially. A wedge member 67 is disposed in each slot 67' and engaged with the adjacent end of the pusher tube or liner 51', each of said wedge members 67 being provided with an inclined wedging surface engageable with one end of one of the gripping members 65. At the opposite end of each gripping member 65, a relatively stationary camming member 68 is disposed in each slot 67' and engages the gripping member 65 in opposed relation to its wedging member 67. Backing up and maintaining the camming members 68 in place is an annulus 68' which is secured to the collet sleeve 42, as by means of a number of screws 69. Thus, axial movement of the pusher tube 51' under the pressure of spring 54 will shift the wedge members 67 toward member 68 so as to force the gripping members 65 radially inward and into tight gripping engagement with a bar therein, thereby securely and rigidly supporting and rotating the stock bar closely adjacent to the cutter D which is operative upon the bar to cut the same to a predetermined diameter. Until the machine is put into operation, a short pilot bar is preferably disposed within the gripping members 65 to hold the gripping means of the collet of spindle A in assembled condition and ready to receive regular stock bars when fed behind the pilot bar.

The spindle cages or supports 36 of spindles B and C are each resiliently biased into operative relation to the relatively fixed spindle A by means of a pair of coiled compression springs 70 associated with each spindle B and C, these springs 70 encircling the respective supporting bars 13 and 14. One end of each spring 70 is engaged with the righthand wall 37, as viewed in Figs. 2 and 2a, of the spindles B and C, while the other end of each spring 70 engages a spring abutment 71 which is fixed on the respective bars 13 and 14 in any suitable manner.

Thus, the spindles B and C are axially shiftable on the supporting bars 13 and 14, and when and if a malformed or oversized bar is presented to the collets C or B, these spindles will be permitted to shift axially against the pressure of the springs 70 in order to preclude damage to the collets of these spindles by such bars, and preferably, such axial movement of either of spindles B or C will function to interrupt operation of the machine in a manner which will be hereinafter more fully described.

*Bar feeding means*

Figure 6:
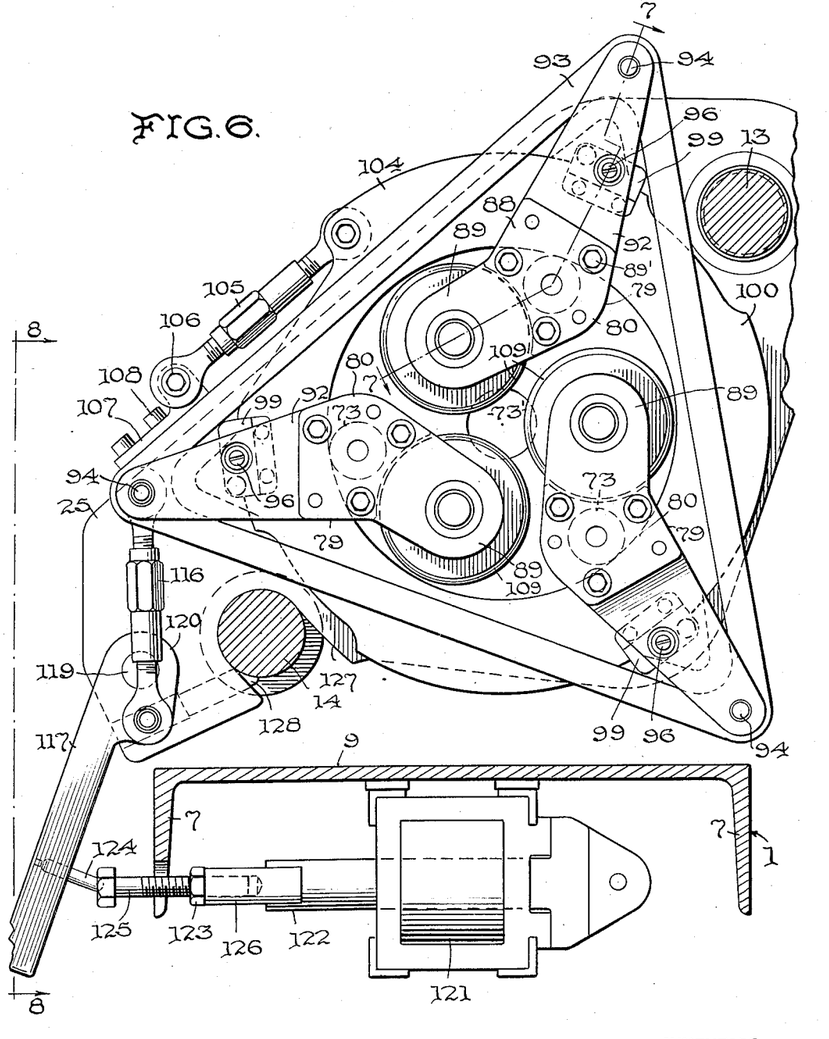
Fig. 6 is a view in vertical section and on an enlarged scale, as taken on the line 6—6 of Fig. 2a, and showing certain details of the feeding means.
Figure 7:
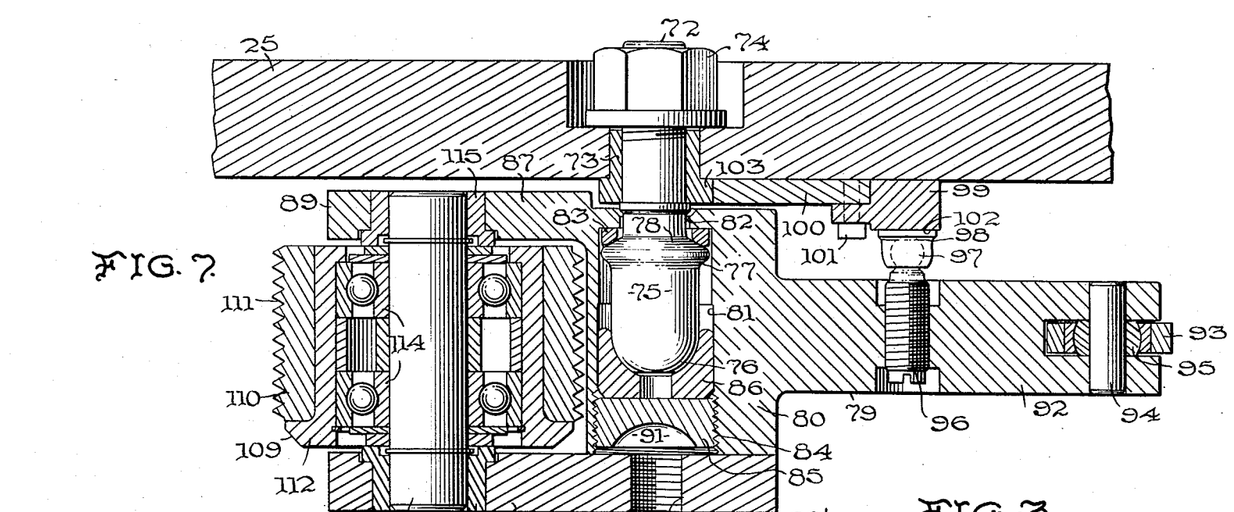
Fig. 7 is an enlarged detail view in section, as taken on the line 7—7 of Fig. 6 through one of the feed rolls and its support.

Referring now to Figs. 2a, 6, 7, 8 and 12, but more particularly to Figs. 6, 7 and 8, it will be noted that the means for feeding bars to advance the same through the previously described spindles are mounted upon the previously mentioned plate 25 which is in turn pivotally mounted upon supporting bar 13. Centrally of the plate 25, it is provided with an opening 73' through which the bars to be turned are allowed to pass. At equidistantly spaced points about the axis of the opening 73', the plate has mounted thereon a plurality of supporting studs 72 having a threaded shank extending through a hardened bushing 73 which is received in an opening in the plate 25, the threaded shank of the studs 72 each being secured in position by means of a nut 74. The studs 72 have an axially extended head 75, the free end of which terminates in a dome-like end portion 76, and intermediate the dome-like end 76 and the bushing 73 the head 75 of each stud 72 is formed with an annular bead thereon, this bead generally being designated at 77 and having an arcuate surface 78 thereon. Mounted upon each stud 72 for universal pivotal movements thereon is a rocker arm 79. The rocker arms 79 each have a relatively large central body portion 80 which is bored as at 81 to receive the respective stud heads 75 and which is counterbored as at 82 to permit the stud shanks to extend through the body portion into the supporting plate 25. In the base of the counterbore 81 there is seated an annular bearing or bushing 83 having a bearing surface complementary to the arcuate surface 78 on the bead 77 of the respective stud heads 75, the beads 77 serving to position the rocker arm 79 relative to the plate 25 and to allow slight universal movement of the rocker arm on the respective studs. The open end of the bore 81 is threaded as at 84 so as to receive a bearing adjusting nut 85, and intermediate the nut 85 and the end 76 of the head 75, there is a bearing or bushing 86 having arcuate surfaces complementary to the domed end 76 of the respective stud heads 75 so as to permit universal movements of a rocker arm 79 on each stud 72.

Integrally formed on the body portion 80 of each rocker arm 79 is a wall 87, and in opposed relation to the wall 87, a plate 88 is secured to the body portion 80 as by means of a suitable number of screw fasteners 89', the walls 87 and 88 forming a bifurcated crank arm generally designated 89 on each rocker arm 79. Each plate 88 preferably is provided with an opening 90 therethrough in axial alignment with the bore 81 so that a suitable tool, such as a screwdriver or the like, may be inserted through the opening 90 to engage the nuts 85 to vary the frictional engagement of the bushings 83 and 86 on the bead 77 and end 76, respectively, of the respective stud heads 75. Each nut 85 is preferably provided with a slot 91 to receive such a tool.

Also preferably integrally formed with the enlarged body 80 of each rocker arm 79 is a rigid lever arm 92, and as best illustrated in Fig. 6, the lever arms 92 extend substantially radially of the axis of the opening 73' through the plate 25. Thus, each rocker arm 79 is in the nature of a bell crank lever pivotally mounted upon the respective stud heads 75 for pivotal movements in a direction parallel to the plate 25, as well as in a direction at right angles to the plate 25.

In order to effect pivotal movements of the rocker arms 79 in parallel relation to the plate 25, the respective free ends of the lever arms 92 of the rocker arms 79 are each bifurcated to receive a triangular frame member 93, this frame 93 being disposed in the bifurcated ends of the arms 92 at each of its three corners, as clearly shown in Fig. 6. A pin 94 extends through the bifurcated end of each lever arm 92, and the pins 94 are interconnected with the triangular frame 93 so as to permit slight universal movement of the respective rocker arms 79, as by means of suitable relatively movable bushings 95. Thus, movement of the triangular frame 93 in a rotative direction about the axis of the opening 73' through plate 25 will effect pivotal movement of the rocker arms 79 about the stud heads 75.

Such pivotal movement of frame 93 is effected for two purposes, namely, to effect minor adjustments in the angular disposition of the crank arms 89 of the respective rocker arms 79 and to effect major adjustments of the arms for purposes which will hereinafter appear.

For effecting pivotal movements of the rocker arms 79 about the stud heads 75 in a direction at right angles to the supporting plate 25, the respective arms 92 of the rocker arms 79 are each provided with a screw-threaded stud 96 projecting towards the plate 25 and having a generally spherical head 97 thereon. These spherical heads 97 have universally mounted thereon a foot or cam follower 98 which respectively engage a corresponding number of rigid cam blocks 99. The cam blocks 99 are secured in equidistantly spaced relation about the outer periphery of a rotatable plate 100, as by means of a suitable number of screw fasteners 101, each cam block 99 having an angularly disposed face 102 with which the respective cam followers 98 are engaged to effect pivotal movements of the respective rocker arms 79 in a direction at right angles to plate 25, as the plate or annular ring 100 is rotated in one direction or the other. In order to centralize the plate or ring 100 and support the same concentrically with relation to the plate 25, the inner periphery of the plate 100 preferably engages a radially extended flange 103 formed on each bushing 73 in which the studs 72 are mounted. For effecting slight rotative movements of the plate 100, this plate is provided with an outwardly extended ear 104 to which is connected one end of an adjustable turnbuckle 105, the other end of said turnbuckle being pivotally mounted, as by means of a headed stud 106 on an anchor bracket 107 which is in turn secured to the plate 25, as by means of a suitable number of screw fasteners 108.

For feeding stock bars through the machine, each bifurcated arm 89 of the respective rocker arms 79 has supported therein a feed roller, generally designated 109, The respective feed rollers 109 include a cylindrical outer sleeve 110 (see Fig. 12), having screw threads 111 thereon, forming a bar-engaging rib having a lead angle or helix angle. Supporting the sleeve 110 is an annular hub 112 which is supported upon a transverse shaft 113 as by means of a suitable number of bearings 114, the shaft 113 being supported in bushings 115 seated in axially aligned openings in the opposed walls 87 and 88 of the respective rocker arms 79.

In view of the fact that each rocker arm 79 supports a feed roller 109, it will readily be seen upon reference to Fig. 6 that the feed rollers 109 are disposed in circumferentially spaced relation about the opening 73' through the supporting plate 25 for engagement with a bar projecting through said opening. It will also be noted that adjustment of the turnbuckles 105 to effect rotation of the plate 100 in one direction or the other will vary the effective helix angle of the threads or bar-engaging rib 111 of each roller 109 by adjusting the axis of the feed rollers 109 relative to the axis of the bar disposed between the rollers. In addition, by imparting slight rotation in one direction or the other to the triangular frame 93, pivotal movements of the rocker arms 79 in a direction parallel to the plate 25 will be effected to vary the spacing between the feed rollers 109 so as to accommodate bars of different sizes, or so as to completely disengage the rollers from the bars.

In order to effect such rotative movement of the frame 93, one of the pins 94 which connect the rocker arms 79 to the frame 93 is axially extended towards the supporting plate 25, as best seen in Fig. 8, and the axially extended portion of said pin 94 is suitably connected to one end of an adjustable turnbuckle 116, the other end of the turnbuckle being pivotally connected to an operating lever 117, as by means of a pin 118 extending through the operating lever 117 and the adjacent end of the turnbuckle 116. The operating lever 117 is pivotally mounted on the supporting plate 25, as by means of a pivot 119, while being free to rotate on the pivot 119. As is best seen in Fig. 6, the operating lever 117 has an enlarged head 120 to which the turnbuckle 116 is connected, and the pivot point of the lever 117 is disposed intermediate the ends of the turnbuckle, whereby movement of the lever 117 will effect movements of the turnbuckle 116 in the manner of a pitman. The operating lever 117 may be operated in any desired manner, but preferably is operated by means of a solenoid 121 secured beneath the top 9 of the frame 1 and between the opposed side walls 7 thereof, this solenoid 121 having an armature 122 provided with adjustable means 123 projecting from beneath the table 9 for engagement with a thrust pin 124 which is preferably interengaged with and carried by the operating lever 117. The adjustable means 123 is preferably in the form of a threaded screw 125 adjustably mounted in a sleeve 126 carried by the armature 122.

Thus, when the solenoid armature 122 is shifted in one direction, as viewed in Fig. 6, the operating lever 117 and turnbuckle 116 will effect a counter-clockwise rotation of the triangular frame 93, so as to effect engagement of the feed rollers 109 with a bar extending through the opening 73' in the plate 25, whereas movement of the armature 122 in the opposite direction will effect clockwise rotation of the frame to rock the rocker arms 79 in the opposite direction about the stud heads 75, so as to shift the feed rollers away from a bar extending through the opening 73'. In addition, minor adjustment of the spacing of the respective feed rollers 109 is produced by manually adjusting the turnbuckle 116 to rotate the triangular frame slightly in one direction or the other as may be required to effect engagement of the feed rollers with bars of different sizes.

It will be particularly noted that the feed rollers 109 are not power operated, but merely idle upon the bars disposed between the feed rollers, the bars being rotated by the collets previously described, and such rotation of the bars imparting rotation to the feed rollers, whereby the helix angle of the bar-engaging ribs or threads thereon will effect an axial feed of the bars.

In addition, in order to facilitate service and/or repair of the feeding means, the plate 25 is pivotally mounted upon the supporting bar 13 at one end of the plate, while the other end of the plate is provided with a notch or cutout 127 in which the supporting bar 14 engages with the plate 25, this notch 127 permitting the plate 25, together with the entire feeding means carried thereby, to be swung upwardly about the supporting bar 13. In order to avoid inadvertment movement of the plate 25 as aforesaid, a locking or latch member 128 preferably projects through the plate 25 into engagement with the bar 14 so as to preclude movement of the plate until such latch member 128 is released.

Axial feeding of successive stock bars through the collets will present the bars to cutting means which will now be described.

*Bar cutting means*

Figure 10:
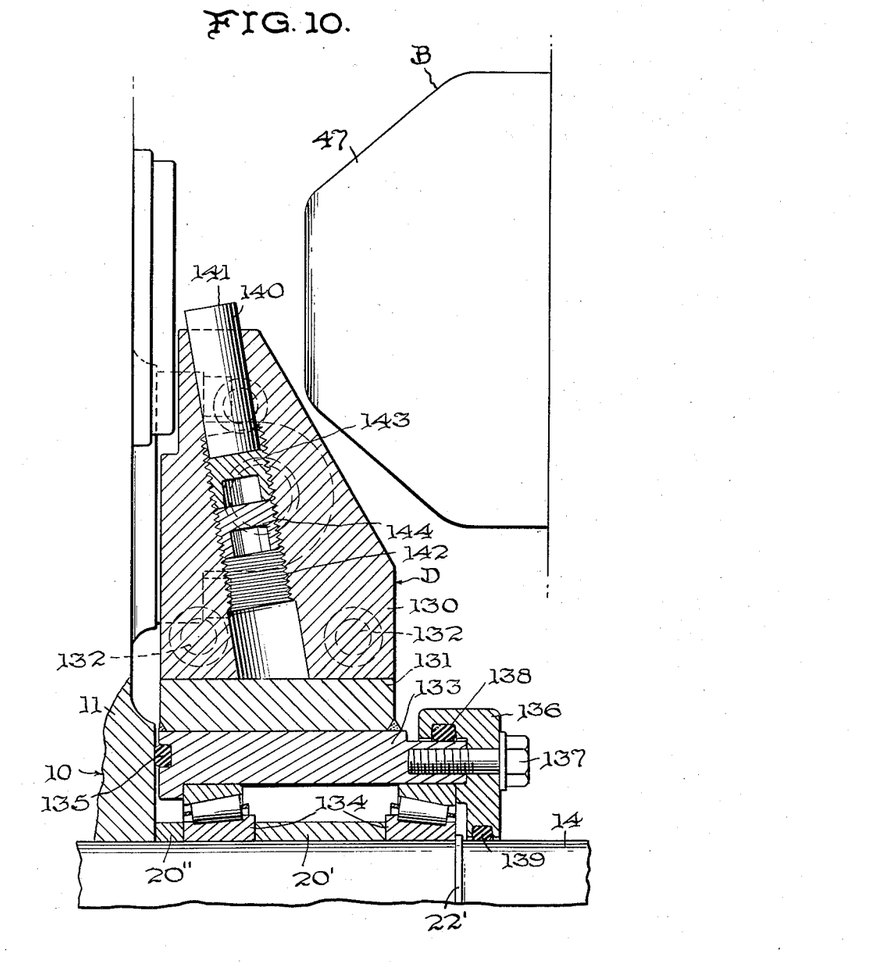
Fig. 10 is a detailed view in section and on an enlarged scale, as taken on the line 10—10 of Fig. 9.

Referring now more particularly to Figs. 2, 9 and 10, it will be seen that the cutting means D is disposed intermediate the spindles A and B and is pivotally mounted upon the supporting bar 14. The cutting means D includes a tool cartridge 130 which is removably carried by a tool supporting arm or head 131, as by means of a suitable number of screw fasteners 132 and a key 132', the head or arm 131 being suitably secured as by welding or the like to a hub 133 which is in turn supported for rotative movements about the supporting bar 14, as by means of a pair of tapered roller bearings 134. For purposes of protecting the bearings 134 against cuttings or other dirt or foreign matter, the hub 133 at one end is provided with an annular seal 135 which engages the adjacent wall 11 of the spindle support 10 of spindle A previously described, and at the other end of the hub 133, there is provided a closure cap in the form of an annular member 136 which encircles the supporting bar 14 and is secured to the hub 133 as by means of a suitable number of screw fasteners 137. When the closure cap 136 is tightened in place by screws 137, pre-loading of bearings 134, 134 is produced so as to eliminate any play of the tool arm on its mounting. Sealing members 138 and 139 respectively engage the outer periphery of the hub 133, the periphery of the supporting bar 14 and the closure 136, so as to prevent entry of cuttings or other foreign materials at this end of the hub 133. The cutter holder or cartridge 130 is preferably bored at a slight angle, as seen in Figs. 9 and 10, to tightly receive and grip a cylindrical cutting element 140 having its outer free end cut off at a right angle to the axis of the cutter element to form an annular cutting edge 141 at the juncture of the end plane of the cutter element with the cylindrical side wall thereof. The cartridge 130 is also preferably counter-bored at 142, this counter bore being threaded to receive a set screw 143 for positioning the cutter element 140 axially in the cartridge 130, and a second set screw 144 is preferably threaded in the counterbore 142 to act as a means for locking the set screw 143 so that the cutter element 140 is maintained in fixed axial position. If it should be desired or necessary to replace the cutting element 140, the cartridge 130 can be easily removed from the supporting arm 131 and a replacement cartridge installed, or the cutter element itself may be easily removed from the cartridge for installation of a new cutter.

As previously mentioned, the cutter element 140 is disposed at a slight angle as viewed in Figs. 9 and 10, and preferably this angle is such that the cutter element 140 has a negative rake and negative clearance relative to a bar being rotated and fed past the cutter element, this negative rake and clearance each preferably being on the order of about ten degrees.

Suitably connected to the side of hub 133 opposite the cutter supporting arm 131 is a generally outwardly and downwardly directed arm 145 which projects down below the level of the opposed side walls 7 of the frame 1, the free end of the arm 145 being pivotally connected to a horizontally extended spring-retaining rod 146, as at 147. A spring seat 148 is suitably affixed to the adjacent side wall 7 and depends therefrom, and the rod 146 projects through an opening 149 through the spring seat and extends beneath the table top 9. Surrounding the rod 146 is a coiled compression spring 150 which is retained upon the rod by means of a spring seat 151 which is secured on the rod as by means of a nut 152, and maintains the spring 150 in engagement with the seat 148. The function of the spring 150 is to tend to swing the cutter holding arm 131 about the supporting bar 14 in a clockwise direction so as to resiliently bias the cutter element 140 to a proper bar cutting position. The bar cutting position of the cutter element 140 can be readily varied by the provision of adjustable means for limiting the extent of rotation of the arm 131 caused by the spring 150 as aforesaid. Preferably, this means is in the form of a screw 153 which is threadedly engaged in a complementally threaded screw support 154 secured to the wall 11 of the adjacent spindle support 10 of spindle A, as by means of a suitable number of screws 155 and dowels 155'. This screw 153 projects from the support 154 into engagement with a head 156 on a hardened plug 157 which is press-fitted in the body of the tool supporting arm 131.

*Operating means and control circuit*

Figure 15:
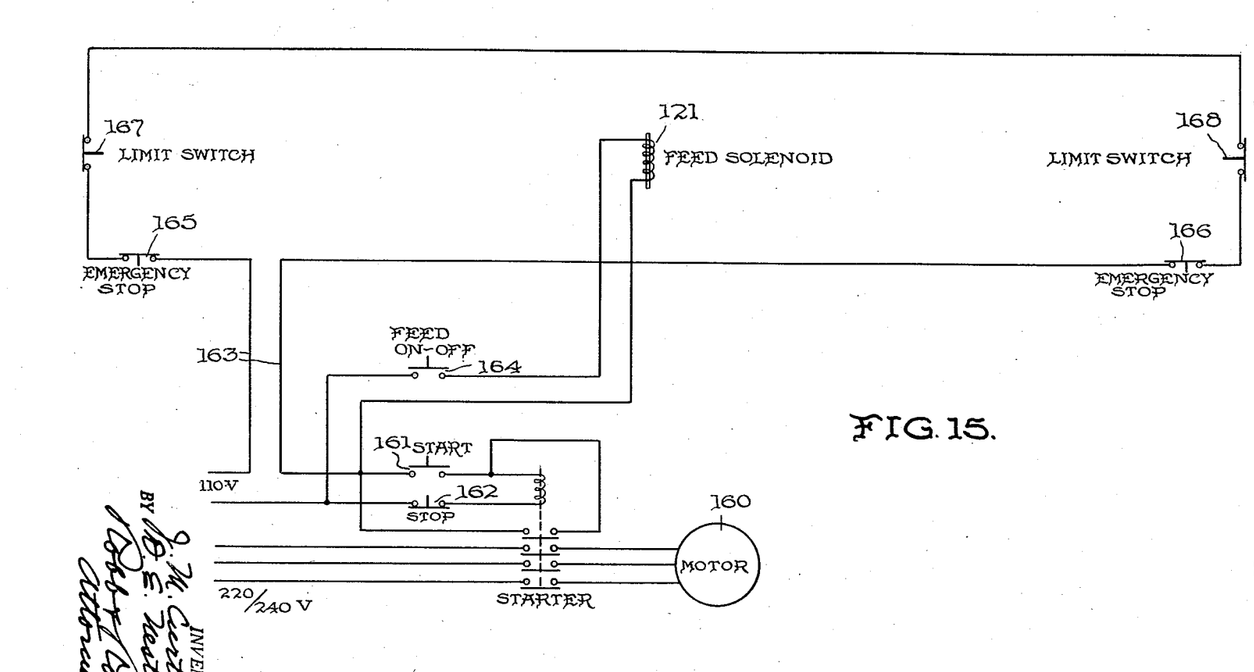
Fig. 15 is a circuit diagram of the electric drive motor circuit and associated control circuits for the machine.

Referring now particularly to Fig. 15, there is shown diagrammatically a control circuit for an electric motor 160 which is preferably utilized as the source of power to drive the variable speed drive 30 previously referred to. As clearly shown in Fig. 15, the electric current to the motor is controlled by a start switch 161 and a stop switch 162 interposed in a control circuit generally designated 163. This control circuit 163 preferably includes, in addition to the stop and start switches 161 and 162, a manually controlled on-and-off switch 164 for controlling the solenoid 121 previously described as being adapted to rock the triangular frame 93 to effect engagement of the feed rolls 109 with a bar, or to effect disengagement thereof. Such an on-and-off switch may be located anywhere on the base 1 as may be desired or convenient. Also, there are preferably provided at opposite ends of the frame of the machine and located in any convenient location, a pair of emergency stop switches 165 and 166 which are preferably manually operated.

As has been previously mentioned, the spindle cages 36 of spindles B and C are resiliently biased in one direction by springs 70, and when a malformed or oversize bar is presented to the collets of the spindles, the spindle cages 36 will be shifted against the pressure of the springs 70 to interrupt operation of the machine. For this purpose, a pair of limit switches 167 and 168 are interposed in the control circuit 163, and these limit switches are preferably mounted on the machine frame adjacent to the respective cages 36. One such switch is shown in Fig. 2 as including a switch body 169 suitably mounted upon the table top 9 and including a plunger 170 projecting from the switch body into engagement with the adjacent wall 37 of cage 36 of spindle B. Another such switch mechainism constituting switch 168 in the diagrammatic circuit of Fig. 15 is also preferably secured on the table top 9 adjacent to the wall 37 of cage 36 of spindle C, as seen in Fig. 2a. However, the latter spindle is shown in partial section in Fig. 2a, and the portion of wall 37 which is adapted to operate the limit switch 168 is not seen in this view.

*General operation*

In operation, to perform the method of the invention on the improved machine just described, successive stock bars of random length to be cut to a predetermined diameter are admitted to the machine at spindle C, either manually or by any suitable known mechanism for automatically feeding such bars. The bars pass through the annular gripping collets 50 and pass on through the pusher tube or liner 51', the rotation of the collet producing a corresponding rotation of successive bars as they are so presented to the machine. As the bars are passed into engagement with the feed rolls 109 at the feeding station, the bars will impart their rotation to the feed rolls, thus effecting an axial feed of the bars by the action of the bar-engaging rib or threads on the feed rolls 109. Of course, the rate of axial feed of the bars will be determined by the speed of rotation thereof and the helix angle of the threads on the rolls. Therefore, in order to vary the rate of axial feed of the bars, the turnbuckle 105 may be adjusted to rotate plate 100, whereby cam surfaces 102 will effect pivotal movement of the roll-carrying rocker arms 79 in a direction at right angles to the supporting plate 25, thus varying the disposition of the axis of the respective feed rolls, and thus varying the effective helix angle or lead of the threads to either increase or decrease the rate of axial feed of the bars, depending upon the direction in which the plate 100 is rotated.

Each successive bar is fed from the feeding means to the rotating collet of spindle A, where it passes through the rigid gripping members 65 and is securely held against radial deflection as the bar is fed past cutting element 140 at the cutting station into the collet of spindle B. As each successive bar leaves the collet of spindle C and passes beyond the feeding means, it will continue to be positively rotated by spindles A and B and the succeeding bar will engage the preceding bar and push the same on past the cutter and through the last collet B, until it finally drops from the collet B. Preferably, at the discharge end of collet B, there will be provided a suitable means (not shown) such as a lined or cushioned chute or conveyor for receiving and carrying the finished bars away from the machine, while protecting the bars against mutilation.

Bars cut down to a predetermined diameter according to the present method on the machine described in the foregoing have a very high quality of surface finish and a very high degree of accuracy, and the superior finish and accuracy of the bars can be primarily attributed to the high rate of speed of rotation of the bars as they are fed past the cutting tool, the preloading of the bearings to preclude radial deflection of the bars which are rotating at a relatively high rate of speed, the angle and form of the cutting tool, and the rigid support afforded to the bars being cut by the supporting and rotating collet members 65 closely adjacent to the cutter.

While the specific details of the invention have been herein shown and described, changes and alterations may be resorted to without departing from the spirit thereof, as defined in the appended claims.

We claim:

1. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means between which the feeding means are located each comprising a rotatable collet for gripping the bars to cause rotation of the latter.

2. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means adjacent the cutting means including a rotatable adjustable collet having means for rigidly supporting the bars relative to the cutting means and for rotating the bars, and the other supporting means comprising a rotatable collet having means for yieldingly gripping the bars to cause rotation of the latter.

3. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means each comprising a rotatable collet and drive means for rotating said collets in unison.

4. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means each comprising a rotatable collet, drive means for rotating said collets, means rotatably supporting the respective collets and including a stationary support, bearing means between said stationary support and the collets, and means for adjustably preloading said bearing means.

5. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means each comprising a rotatable spindle having a bar supporting collet, drive means for rotating said spindles, means rotatably supporting the respective spindles including a stationary support, bearing means between said stationary support and the spindles, and means for adjustably preloading said bearing means, said bearing means including an inner race disposed about the spindle, an outer race, rotatable bearing elements between said races, a shiftable cam operable upon one of said races to force the same toward the other race, and means for shifting the cam to vary the pressure on the rotatable bearing elements.

6. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means including a rotatable collet, said collet having means for varying the diameter of the opening therethrough to accommodate bars of different diameters.

7. A bar turning machine, comprising a plurality of axially spaced and coaxially aligned bar supporting means each including means for rotating a bar and permitting successive bars to be advanced axially from one supporting means to another, means between adjacent supporting means for feeding successive bars axially, and relatively fixed bar cutting means adjacent to one supporting means for cutting successive bars to a predetermined diameter as the latter are fed past the cutting means, said bar supporting means including a rotatable collet, said collet having means for varying the diameter of the opening therethrough to accommodate bars of different diameters and including an axially adjustable tube forming a liner through which the bars pass, the collet having a radially adjustable bar-gripping member, a cam member operative on said bar-gripping member to effect radial adjustment thereof, said tube having means at one end thereof for adjusting the same axially, and the other end of said tube being engaged with one of said members to shift the same relative to the other of said members to radially adjust said bar-gripping member.

8. A bar turning machine, comprising a base, a first spindle fixedly mounted on said base, longitudinally extended supporting means extending outwardly from opposite sides of said spindle, a second spindle mounted on the supporting means at one side of the first spindle, and a third spindle mounted on the supporting means at the other side thereof, said spindles being disposed in axial alignment for allowing a bar to be advanced from the second spindle to the third spindle, and each spindle having means for imparting rotation to a bar while allowing axial movement of the bar, means for operating the bar rotating means, bar feeding means mounted on the supporting means between the first and second spindles and having means for feeding a bar axially as the bar is advanced from the second spindle to the first spindle, and bar cutting means mounted on the supporting means between the first and third spindles and adapted to cut bars to a predetermined diameter as they are successively advanced as aforesaid by said feeding means.

9. A bar turning machine as defined in claim 8, wherein the second and third spindles are shiftably mounted on the supporting means, and including means yieldingly maintaining the second and third spindles in a normal operative position relative to the first spindle while allowing the second and third spindles to be shifted on their supporting means when an oversize bar is presented thereto, and means operable responsive to shifting movements of the second and third spindles for interrupting operation of the bar supporting means.

10. A bar turning machine as defined in claim 8, wherein the feeding means includes a plurality of adjustable feed elements disposed for engagement with the bars, a support on which said feed elements are adjustably mounted, means interengaged with said feed element support and the feed elements for adjusting the feed elements to feed bars of different diameters, and means interengaged with the feed element support and the feed elements for adjusting the rate of axial feed imparted to the bars from the feed elements.

References Cited in the file of this patent

UNITED STATES PATENTS

| 727,440 | Rabiger | May 5, 1903 |
| 1,611,418 | Clipsham | Dec. 21, 1926 |
| 1,714,246 | Seibert | May 21, 1929 |
| 1,809,880 | Wise | June 16, 1931 |
| 1,830,027 | Hayden | Nov. 3, 1931 |
| 1,949,527 | Briney | Mar. 6, 1934 |
| 2,002,705 | Moller | May 28, 1935 |
| 2,230,336 | Taylor | Feb. 4, 1941 |
| 2,319,963 | Wilson et al. | May 25, 1943 |
| 2,346,706 | Stoner | Apr. 18, 1944 |
| 2,376,476 | Chatelain | May 22, 1945 |
| 2,377,383 | Slovak | June 5, 1945 |
| 2,437,679 | Burgess | Mar. 16, 1948 |
| 2,562,455 | Gridley | July 31, 1951 |
| 2,611,290 | Bullard | Sept. 23, 1952 |
| 2,700,119 | Krell | Jan. 18, 1955 |

FOREIGN PATENTS

| 2,122 | Great Britain | Jan. 26, 1912 |
| 518,261 | Germany | Feb. 13, 1931 |
| 707,456 | Germany | Jan. 23, 1941 |